United States Patent [19]
Figueroa

[11] 3,902,053
[45] Aug. 26, 1975

[54] PRE-SET CIRCUIT FOR MEASURING A DIVIDING PARTICLE SIZE OF A PARTICULATE SYSTEM

[75] Inventor: David R. Figueroa, Pembroke Pines, Fla.

[73] Assignee: Coulter Electronics, Inc., Hialeah, Fla.

[22] Filed: Mar. 18, 1974

[21] Appl. No.: 451,788

[52] U.S. Cl. .............. 235/151.3; 235/183; 328/127
[51] Int. Cl.² .................... G01N 15/02; G06G 7/18
[58] Field of Search ............ 235/151.3, 183; 330/85; 328/127

[56] References Cited
UNITED STATES PATENTS

| | | |
|---|---|---|
| 3,101,406 | 8/1963 | Engelman .......................... 235/183 |
| 3,557,352 | 1/1971 | Hogg et al. ....................... 235/151.3 |
| 3,582,675 | 6/1971 | Jordan et al. .......................... 330/85 |
| 3,801,919 | 4/1974 | Wilkes et al. .......................... 330/85 |
| 3,809,874 | 5/1974 | Pozzetti et al. ....................... 235/183 |

*Primary Examiner*—Felix D. Gruber
*Attorney, Agent, or Firm*—Silverman & Cass

[57] ABSTRACT

A pre-set circuit in an apparatus for measuring a dividing particle size of a particulate system operates, prior to apparatus operation, to pre-set the apparatus to indicate a selected dividing particle size. This pre-selection increases the speed at which the apparatus moves towards that particle size above and below which size predetermined fractions of the total mass of the particulate system are respectively included.

7 Claims, 2 Drawing Figures

3,902,053

PRE-SET CIRCUIT FOR MEASURING A DIVIDING PARTICLE SIZE OF A PARTICULATE SYSTEM

CROSS-REFERENCE TO RELATED APPLICATIONS

This application is related to U.S. Pat. No. 3,557,352 entitled "Apparatus and Method for Measuring a Dividing Particle Size of a Particulate System", which patent is hereby incorporated by reference into this application.

BACKGROUND OF THE INVENTION

In the apparatus identified in the above noted patent, the particles in a particulate system are passed through a Coulter type apparatus. Each particle causes a particle pulse to be developed whose amplitude is proportional to the size of the particle producing it. The particle pulses are changed into representative electrical quantities, such as charges, which are proportional to the pulse amplitudes and hence, the respective size of the particles themselves. These electrical quantities or charges are passed by either one or two channels to an accumulating circuit. One of the two channels provides a positive charge and the other channel a negative charge. The accumulating circuit sums the charges in both of the channels and develops a charge proportional to the total charges coupled thereto. A threshold circuit which discriminates between particle pulses produced by particles above and below a particular size causes the charges to be coupled to one or the other of the two channels. The threshold level of the threshold circuit is changed either manually or electrically until the accumulated amount of charge stabilizes at a particular level. This level represents that dividing size, above and below which size predetermined portions of the total mass of the system are respectively included. In the practical apparatus for example size may be the mass median particle size or any other dividing size.

When the apparatus operation is initiated, there is no charge in the accumulating circuit. This, of course, would indicate a dividing size of zero. As the charges accumulate, the total charge starts moving away from zero towards that total charge representing that desired dividing size above and below which size predetermined fractions of the total mass of the system are included. This initial charging and movement away from zero toward the dividing size not only requires considerable time, but also, slows down as the total charge is approached. If the speed at which the accumulator charging and the movement toward the dividing size could be increased, or if the accumulator could be pre-charged to a charge somewhat approximating that charge representing that dividing size above and below which size predetermined fractions of the total mass of the system are included, the total time necessary to ascertain that charge, and therefore the dividing size of the particulate system could be reduced, thus increasing the number of tests which can be performed in a period of time and the usefulness of the apparatus.

SUMMARY OF THE INVENTION

An apparatus is provided for ascertaining that particle size, within a particulate system, above and below which dividing size predetermined fractions of the total mass of the system are respectively included. The apparatus is operative to move the particles within the particulate system relative to a sensing device which responds to movement of individual particles to produce electrical changes in the apparatus which are proportional respectively to the size of the individual particles moved relative to the sensing device. These electrical changes are accumulated by an accumulating device in the apparatus and are used by the apparatus in order to ascertain that particle dividing size above and below which size predetermined fractions of the total mass of the system are respectively included.

The apparatus includes a pre-set circuit which is coupled to the accumulating device. The pre-set circuit is operative prior to the apparatus operation to couple to the accumulating device electrical changes which are proportional to a first particle size, thereby pre-setting the accumulating device at a first predetermined level of electrical change and increasing the speed at which the accumulating device reaches the final level of electrical change and therefore the speed at which the particle size is ascertained.

DETAILED DESCRIPITON OF THE DRAWINGS

Figure 1:
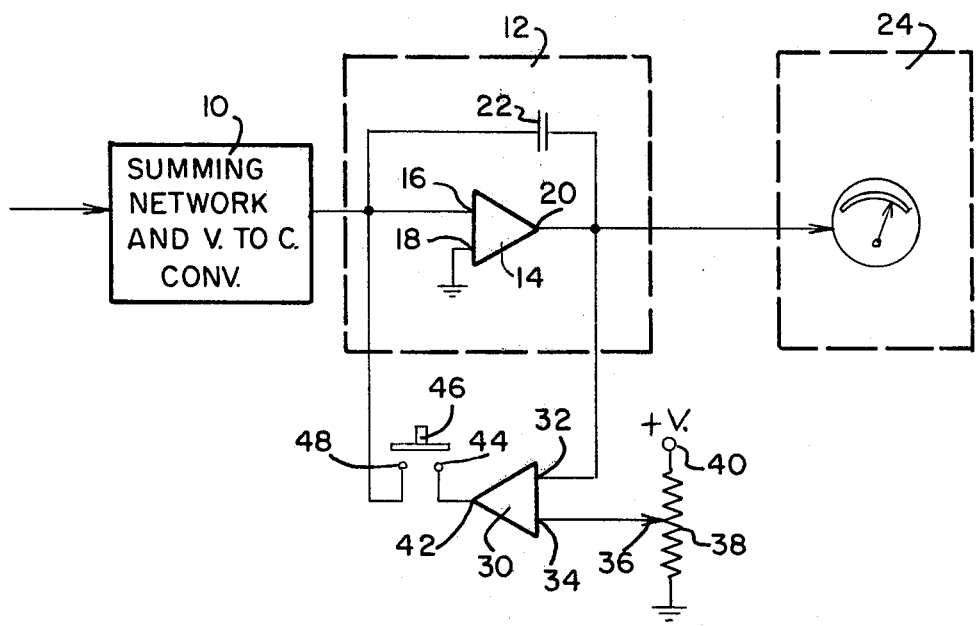
FIG. 1 is a block diagram of the pre-set circuit of this invention shown incorporated into a portion of FIG. 6 of the patent which is incorporated by reference.

In this application when a circuit corresponds to a circuit in the incorporated patent, the circuit number in the incorporated patent, in parentheses and followed by a prime, will be cited in at least one instance when identifying the circuit in this application in order to simplify cross-referencing.

For a complete understanding of the purpose and operation of the apparatus for measuring a dividing particle size of a particulate system reference is to be made to the patent incorporated by reference. However, for purposes of a more clear understanding of this application, some explanation of the circuitry shown and described in the incorporated patent, and operatively associated with the pre-set circuit is in order.

In the original apparatus shown in FIG. 6 of the incorporated patent, particles in a particulate system are passed through a signal producing means (30') which can be assumed to consist of a Coulter type particle detector. The particles, when coupled to signal producing means (30'), will cause a succession of pulses to be developed at conductor (32'), each pulse being proportional to the size of the particle which produced the pulse. These pulses ultimately produce pulses at conductor (47') which are equal in amplitude to the pulses developed at conductor (32') but have a fixed or predetermined duration. The pulses developed at conductor (47') are coupled through one of up switch (52') or down switch (54') in accordance with the setting of a variable threshold circuit (34') and a switch control (56'). If up switch (52') is selected, positive pulses are coupled to a summing network (102'). If down switch (54') is selected, negative pulses are coupled to summing network (102'). The positive and negative pulses are converted by summing network (102') to positive and negative charges which are coupled to integrating amplifier (104'). Integrating amplifier (104') will begin to charge from a zero or reference charge towards a particular charge level which represents that dividing size, above and below which size predetermined portions of the total mass of the system are respectively included. The output of integrating amplifier (104') is coupled via conductor (68') back to variable threshold circuit (34'). Variable threshold circuit (34') varies in response to the signal coupled from integrating amplifier (104') in order to select a threshold level corresponding to that dividing size of the particulate system. That dividing size can for example be the mass median particulate size. The variable threshold circuit (34') determines whether up switch (52') or down switch (54') will be actuated in response to particle pulses, thus determining whether a positive or negative charge will be coupled to integrating amplifier (104').

When operation of the apparatus is initiated, there is no charge accumulated in integrating amplifier (104'). This, of course, would indicate a dividing size of zero. As the charges are accumulated in integrating amplifier (104'), the total charge in integrating amplifier (104') starts moving away from zero towards that total charge representing that desired dividing size above and below which size predetermined fractions of the total mass of the system are included. This initial charging and movement away from zero of integrating amplifier (104') not only taken considerable time, but also the charging of integrating amplifier (104') and movement towards that dividing size slows down as the dividing particle size is approached. Pre-setting integrating amplifier (104') so that it is charged to a value somewhat near the charge representing that dividing particle size will increase the speed at which the apparatus ascertains that dividing size of the particulate system and stabilizes at the desired charge level in integrating amplifier (104'). It is this pre-set circuit feature towards which this patent application is directed.

Referring to FIG. 1 of this application, there is shown a summing network and voltage to charge converter 10 (102') which receives positive and negative pulses from up switch (52') and down switch (54') and converts the pulses to positive and negative charges. These positive and negative charges are coupled to integrating amplifier 12 (104'). Integrating amplifier 12 in this embodiment is of the type commonly known in the art which includes an operational amplifier 14 having a negative input 16 coupled to the output of summing network and voltage to charge converter 10, a positive input 18 coupled to ground potential, and an output 20. An integrating capacitor 22 is coupled between input 16 and output 20 of operational amplifier 14. Capacitor 22 develops a charge, or voltage thereacross in response to the positive and negative charges coupled from summing network and voltage to charge converter 10. This voltage developed across capacitor 22 is coupled from output terminal 20 to readout 24 (122') which is calibrated to provide a visual indication of the particle size corresponding to the voltage developed across capacitor 22.

An amplifier 30, which in the embodiment shown is also an operational amplifier arranged to operate as a differential amplifier, has a first input 32 coupled to output 20 of amplifier 14, and a second input 34 coupled to the movable arm 36 of potentiometer 38. One terminal 40 of poetentiometer 38 is coupled to supply potential and a second terminal is coupled to ground potential. The output 42 of operational amplifier 30 is coupled to one terminal 44 of switch 46, and a second terminal 48 of switch 46 is coupled to input 16 of amplifier 14.

Figure 2:
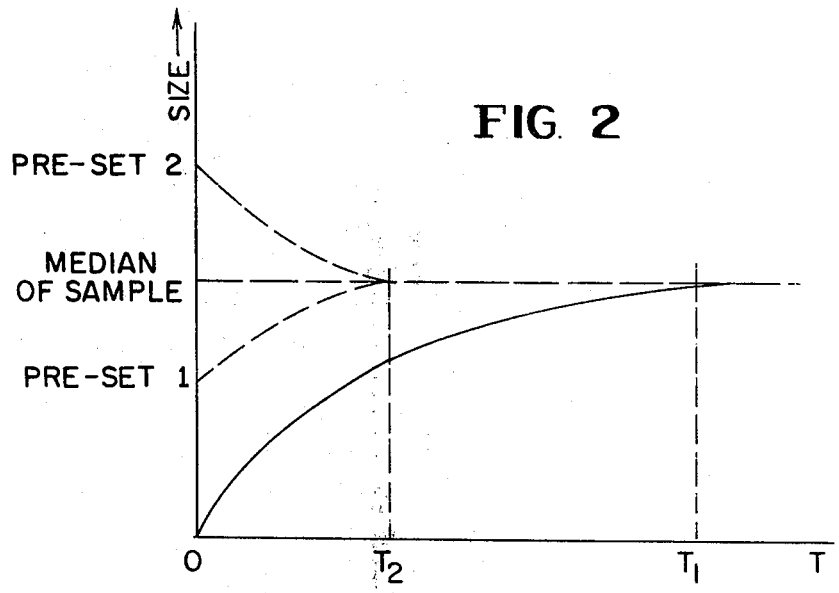
FIG. 2 is a waveform representation of the charging characteristics of the integrator in the pre-set circuit shown in FIG. 1.

In operation, potentiometer 38 is set so as to provide a voltage at arm 36 equivalent to a charge that represents a particular dividing particle size in the particulate system. This setting is selected by the technician operating the equipment in accordance with his estimate of the median size of the particles in the particulate system. Prior to the apparatus operation, or after initiation of operation and before particles are coupled to the signal producing means (30'), capacitor 22 and output 20 of amplifier 14 have a zero charge which, of course, is coupled to input 32 of amplifier 30. The second input 34 of amplifier 30 receives the voltage coupled from tap 36 of potentiometer 38. The difference between the voltage at input 34 and input 32 will cause a different signal to develop at output 42. When push button 46 is depressed, the voltage developed at output 42 is coupled to input 16 of amplifier 14 causing capacitor 22 to charge to a voltage sufficient so that the output at 20, and therefore input 32 of amplifier 30 is equal to input 34. Capacitor 22 is now pre-set to a voltage or charge corresponding to a particle size selected by the technician via potentiometer 38. Such a pre-charging is shown in FIG. 2 as either pre-set 1 or pre-set 2. The charge across capacitor 22 will not discharge because amplifier 14, being an operational amplifier, has an infinite input impedance prohibiting discharge through the amplifier. Furthermore, summing network and voltage to charge converter 10 does not provide a path which will allow discharge of capacitor 22. Upon actuation and operation of the apparatus, the passage of particles through signal producing means (30') will cause pulses, which will be converted by summing network and voltage to charge converter 10 to positive and negative charges further charging and discharging capacitor 22. This charging and discharging will continue until a state of equilibrium is reached corresponding to that total charge representing that desired dividing size above and below which size predetermined fractions of the total mass of the system are included.

Referring to FIG. 2, when capacitor 22 is initially uncharged, it will take until a time $T_1$ to closely approach that total charge representing that desired dividing size. When capacitor 22 is pre-set via the circuitry shown in FIG. 1 it will start as a charge shown in FIG. 2 as pre-set 1 or pre-set 2. Charging to that total charge representing that desired dividing size will take only until the time $T_2$ which, as is shown in FIG. 2, is a much shorter period of time than $T_1$.

As can be seen, the combinations which can be formed in order to provide this pre-set function are many and the embodiment described is only one of the more simple, practical and applicable to commerical versions. For a person skilled in the art to construct a version not specifically shown and described would be a trival rearrangement of the circuit functions of the invention and would not constitute departure from the scope thereof as defined in the appended claims.

I claim:

1. In an apparatus for ascertaining that particle size, within a particulate system, above and below which size predetermined fractions of the total mass of the system are respectively included, said particle size being the dividing size between fractions, wherein the apparatus is operative upon initiation to move said particulate system in a fluid medium relative to sensing means responsive to movement of individual particles to produce electrical changes in said apparatus proportional respectively to the size of said individual particles, and wherein said apparatus is operative to accumulate said electrical changes in an accumulating means for ascertaining said particle size, the improvement comprising, a pre-set circuit coupled to said accumulating means for coupling thereto electrical changes proportional to a first particle size prior to apparatus operation for increasing the speed at which said particle size is ascertained.

2. The apparatus of claim 1 wherein said accumulating means includes, integration means and said electrical changes are electrical charges, said pre-set circuit including circuit means coupled to said integration means for charging said integration means to an electrical charge level proportional to a first particle size.

3. The apparatus of claim 2 wherein said circuit means includes potentiometer means having a first terminal coupled to a source of potential and a second terminal coupled to said integration means for coupling thereto electrical charges proportional to said first particle size.

4. The apparatus of claim 2 wherein said integration means includes an integrator amplifier having an input and an output and said circuit means includes, amplifier means having a first input coupled to said integrator amplifier output, a second input coupled to a source of potential, and an output coupled to said integrator amplifier input.

5. The apparatus of claim 4 further including potentiometer means coupled between said source of potential and to said second input for adjusting the potential coupled to said second input in accordance with said first particle size.

6. The apparatus of claim 4 further including switch means coupled between said amplifier output and said integrator amplifier input for coupling said amplifier output to said integrator amplifier input prior to apparatus operation.

7. The apparatus of claim 4 wherein said amplifier means is an operational amplifier.

* * * * *